United States Patent [19]
Cavallaro et al.

[11] Patent Number: 5,873,796
[45] Date of Patent: Feb. 23, 1999

[54] MULTI-LAYER GOLF BALL COMPRISING A COVER OF IONOMER BLENDS

[75] Inventors: Christopher Cavallaro, Attleboro; Murali Rajagopalan, South Dartmouth; Barbara Steffani Levitt, Lakeville; Dean A. Snell, Acushnet, all of Mass.

[73] Assignee: Acushnet Company, Fairhaven, Mass.

[21] Appl. No.: 562,318

[22] Filed: Nov. 22, 1995

Related U.S. Application Data

[63] Continuation-in-part of Ser. No. 482,521, Jun. 7, 1995, abandoned, which is a continuation-in-part of Ser. No. 160,370, Nov. 29, 1993, abandoned, which is a continuation of Ser. No. 625,225, Dec. 10, 1990, abandoned.

[51] Int. Cl.$^6$ .................................................. A63B 37/12
[52] U.S. Cl. .................... 473/365; 473/361; 473/377; 473/364; 473/363; 428/515; 428/520; 428/522; 428/213; 428/304.4; 428/423.1; 428/424.2; 428/516
[58] Field of Search ..................... 473/351, 356, 473/361, 364, 365, 373, 372, 376, 377; 428/516, 514, 515, 520, 522, 212, 213, 215, 332, 304.4, 423.1, 424.2; 525/221, 196

[56] References Cited

U.S. PATENT DOCUMENTS

| | | | |
|---|---|---|---|
| 696,353 | 3/1902 | Richards | 473/368 |
| 696,366 | 3/1902 | Kempshall | 473/370 |
| 3,310,102 | 3/1967 | Trombe | 165/133 |
| 3,359,231 | 12/1967 | Kent | 524/493 |
| 3,490,146 | 1/1970 | Guichet | 433/69 |
| 4,123,061 | 10/1978 | Dusbiber | 473/377 |
| 4,234,184 | 11/1980 | Deleens et al. | 473/378 |
| 4,337,947 | 7/1982 | Saito et al. | 473/356 |
| 4,398,000 | 8/1983 | Kataoka et al. | 525/437 |
| 4,431,193 | 2/1984 | Nesbitt | 473/374 |
| 4,625,964 | 12/1986 | Yamada | 273/62 |
| 4,650,193 | 3/1987 | Molitor et al. | 273/228 |
| 4,714,253 | 12/1987 | Nakahara et al. | 273/228 |
| 4,781,383 | 11/1988 | Kamada et al. | 273/228 |
| 4,848,770 | 7/1989 | Shama | 273/228 |
| 4,863,167 | 9/1989 | Matsuki et al. | 273/62 |
| 4,883,814 | 11/1989 | Sullivan | 514/524 |
| 4,919,434 | 4/1990 | Saito | 273/235 R |
| 4,984,804 | 1/1991 | Yamada et al. | 473/372 |
| 4,986,545 | 1/1991 | Sullivan | 473/372 |
| 5,000,459 | 3/1991 | Isaac | 473/356 |
| 5,002,281 | 3/1991 | Nakahara et al. | 273/220 |
| 5,026,067 | 6/1991 | Gentiluomo | 273/220 |
| 5,068,151 | 11/1991 | Nakamura | 428/407 |
| 5,072,944 | 12/1991 | Nakahara et al. | 273/220 |
| 5,104,126 | 4/1992 | Gentiluomo | 273/238 |
| 5,120,791 | 6/1992 | Sullivan | 525/196 |
| 5,150,906 | 9/1992 | Molitor et al. | 273/220 |
| 5,159,035 | 10/1992 | Evani | 526/240 |
| 5,184,828 | 2/1993 | Kim et al. | 273/228 |
| 5,222,739 | 6/1993 | Horiuchi et al. | 473/356 |
| 5,253,871 | 10/1993 | Viollaz | 273/228 |
| 5,298,571 | 3/1994 | Statz et al. | 525/330.2 |
| 5,314,187 | 5/1994 | Proudfit | 273/235 R |
| 5,415,937 | 5/1995 | Cadorniga et al. | 428/407 |
| 5,439,227 | 8/1995 | Egashira et al. | 273/223 |
| 5,467,994 | 11/1995 | Moriyama et al. | 273/222 |
| 5,492,972 | 2/1996 | Stefani | 525/196 |
| 5,553,852 | 9/1996 | Higuchi et al. | 473/373 |
| 5,556,098 | 9/1996 | Higuchi et al. | 473/373 |

FOREIGN PATENT DOCUMENTS

| | | |
|---|---|---|
| 2 260 546 | 4/1993 | United Kingdom . |
| 2 267 908 | 12/1993 | United Kingdom . |
| 2267908 | 12/1993 | United Kingdom . |
| 2 278 609 | 12/1994 | United Kingdom . |
| 2278609 | 12/1994 | United Kingdom . |

OTHER PUBLICATIONS

Surlyn Product Guide, pp. 1–8, Aug. 1994.
"Encyclopedia of Polymer Science and Engineering" vol. 8, pp. 404–407, 1985.

*Primary Examiner*—Paul Thibodeau
*Assistant Examiner*—D. Lawrence Tarazano
*Attorney, Agent, or Firm*—Pennie & Edmonds LLP

[57] ABSTRACT

The present invention relates to a golf ball cover composition comprising: a) from about 45 to 55 weight percent of a first high acid ionomer having an acid content of about 19 weight percent and, b) from 55 to 45 weight percent of an ionomer selected from the group consisting of i) a second high acid ionomer having acid groups neutralized with a different metal ion than said first high acid ionomer, and ii) an ionomer containing about 15 weight percent acid groups.

36 Claims, No Drawings

MULTI-LAYER GOLF BALL COMPRISING A COVER OF IONOMER BLENDS

CROSS REFERENCES TO RELATED APPLICATIONS

The present application is a continuation-in-part application of U.S. Ser. No. 08/482,521 filed Jun. 7, 1995, now abandoned which is a continuation-in-part of U.S. Ser. No. 08/160,370, filed Nov. 29, 1993, now abandoned which is a continuation of application Ser. No. 07/625,225, filed Dec. 10, 1990 now abandoned.

FIELD OF THE INVENTION

This invention generally relates to golf balls, and, in particular, to a composition and method for the manufacture of high acid, zinc, lithium and sodium neutralized ionomer blend golf ball covers for use in two piece and multilayer applications.

BACKGROUND OF THE INVENTION

Other than one-piece practice or driving range balls, golf balls are generally available as two-piece and three-piece balls.

Three-piece or wound balls, which are preferred by professionals and low handicap amateurs, comprise either a solid rubber or liquid filled rubber center or core, covered by elastic windings. Wound balls typically have a cover of balata, which exhibits enhanced playability properties, but lacks the durability required for repetitive play, or an ionomer resin. Wound balls provide better golfers with a higher spin rate and more control than two-piece balls. In contrast, two-piece golf balls, used by the average amateur golfer, provide a combination of durability and maximum distance. Two-piece balls have a core formed of a single solid sphere, which is typically comprised of a polybutadiene base compound, and an ionomer resin cover that encloses the core.

Ionomer resins are polymeric materials containing interchain ionic bonding. They are sold by E. I. Du Pont de Nemours & Company under the trademark SURLYN®, and by Exxon Corporation under the trademark ESCOR® and the trade name IOTEK. Because of their toughness, durability, and flight characteristics, ionomers have become the material of choice for golf ball covers. Golf ball covers made from ionomers possess the durability for repetitive play that is lacking in balata covers.

Ionomer resins are generally ionic copolymers of an olefin, such as ethylene, and a metal salt of an unsaturated carboxylic acid, such as acrylic or methacrylic acid. A portion of the pendant acid groups in the copolymer are neutralized with a metal, such as sodium or zinc to produce a thermoplastic elastomer with enhanced durability compared to balata.

At present there are more than 50 commercial grades of ionomers available from Du Pont and Exxon. The properties of these ionomers vary over a wide range according to the type and amount of metal cations present in the polymer, the molecular weight, the composition of the base resin, and additives, if any, that are included in the resin. Research continues in an effort to develop a golf ball cover composition having the improved distance of an ionomer cover with the playability of balata.

The distance a golf ball will travel is determined by a number of factors, including the coefficient of restitution (COR), ball size, weight, club head speed, angle of trajectory, and the dimple pattern, which controls the aerodynamics of the ball. The COR and the dimple pattern are factors that are under the control of the manufacturer, and, therefore, are of particular concern to the manufacturer.

The COR of a golf ball can be measured by propelling a ball at a hard, unyielding surface at a known speed, and measuring its speed immediately after impact. The COR is the ratio of the speed after impact to the speed before impact, and can vary from zero for a totally inelastic collision to one for a totally elastic collision. For macroscopic objects, the COR is always less than one.

The COR for a one-piece ball is a function of the composition only. However, in two-piece and three-piece balls, the COR is a function of the core and the cover.

Although the United States Golf Association (USGA) does not place any specific limitations on the COR, a USGA approved ball cannot exceed an initial velocity of 255 feet/second under specified test conditions, which places an effective limitation on the COR. Therefore, golf ball manufacturers seek to produce golf balls with a high COR so that the ball will approach or equal 255 feet/second in the USGA test without violating the speed limitation.

In their attempts to produce golf balls that provide the maximum distance while remaining within the USGA rules, golf ball manufacturers have produced various blends of ionomer resins. However, a need still exists for an ionomer blend for golf ball covers that provides the durability required for repetitive play, the COR required to provide maximum distance under the USGA rules, and the playability and control desired by better golfers. The present invention provides one such cover composition.

SUMMARY OF THE INVENTION

The present invention is directed to a golf ball cover blend composition, which comprises a) from about 45 to 55 weight percent of a first high acid ionomer having an acid content of about 19 weight percent; and b) from 55 to 45 weight percent of an ionomer selected from the group consisting of i) a second high acid ionomer having acid groups neutralized with a different metal ion than said first high acid ionomer, and ii) an ionomer containing less than about 16 weight percent acid groups.

The present invention relates to a golf ball cover composition, which comprises from about 45 to 55 weight percent of a first high acid ionomer and from 55 to 45 weight percent of a second high acid ionomer different from the first high acid ionomer or an ionomer containing less than about 16 weight percent acid groups.

The present invention also relates to golf balls, and, in particular to golf ball covers comprising 50/50 blends, i.e., blends containing equal parts by weight, of two high acid ethylene-methacrylic or ethylene acrylic acid ionomers, containing about 19 weight percent acid, wherein the acid in one of the ionomers is at least partially neutralized by sodium ions, and the acid in the other ionomer is at least partially neutralized by zinc ions.

The present invention also relates to methods of manufacturing golf balls and golf ball covers that comprises blending equal weights of lithium and zinc-neutralized ethylene-methacrylic acid ionomers, containing about 19 weight percent acid, and a sodium-neutralized ethylene-methacrylic acid ionomer, containing about 19 weight percent acid, to form a golf ball cover composition comprising a 50/50 blend of the two ionomers, and forming a golf ball cover from the composition on a golf ball core.

The present invention is also directed to a golf ball comprising: (a) a core; (b) at least one mantle layer disposed between the core and a cover layer, wherein the mantle layer comprises a material selected from the group consisting of dynamically vulcanized thermoplastic elastomer, functionalized styrene-butadiene elastomer, thermoplastic polyurethane or metallocene catalyzed polymer, a thermoplastic polyetherester block copolymer or polyetheramide block copolymer, thermoplastic polyesters, polyetherester block copolymer, polyesterester and thermoplastic ionomer resins; and (c) a cover layer comprising 1) from about 45 to 55 weight percent of a first high acid ionomer having an acid content of about 15 to 20 weight percent; and 2) from 55 to 45 weight percent of an ionomer selected from the group consisting of i) a second high acid ionomer having acid groups neutralized with a different metal ion than said first high acid ionomer, and ii) an ionomer containing less than about 16 weight percent acid groups.

In a preferred embodiment, the present invention is also directed towards a multi-layer golf ball which comprises a core; a cover layer comprising an inner layer and an outer layer, wherein the outer layer comprises a material with a lower melting point or heat of reaction temperature (also referred to as cure temperature) than that of the material of the inner layer; and either the inner layer or the outer layer comprises at least one high acid ethylene-methacrylic or ethylene-acrylic acid ionomer.

The present invention is still further directed to a multi-layer golf ball which comprises a core, at least one cover layer comprising a blend of two high acid ionomers, and at least one mantle layer disposed between the core and cover layer wherein properties such as the thickness, hardness, flexural modulus, tensile modulus or Bayshore resilience of the various layers is such as to provide a ball with optimum performance characteristics.

The core can be either a solid core for a two-piece ball, which can also comprise a solid, intermediate layer between the cover and the central core, or a wound core for a three-piece ball. The cover composition may also contain additional ingredients, including, but not limited to pigments, dyes, U.V. absorbers, and optical brightness.

DETAILED DESCRIPTION OF THE INVENTION

For purposes of the present invention the term about, when used to modify the quantity of ingredient(s) in a golf ball cover blend, is meant to include small deviations which may occur during manufacturing and result in the final blend not being exactly the quantity specified.

The present invention relates to improved golf ball covers produced from blends of at least one high acid ionomer. The golf ball cover blends of the present invention comprise from about 45 to 55 weight percent of a high acid ionomer and from 55 to 45 weight percent of either another high acid ionomer or an ionomer containing less than about 16 weight percent acid groups. Most preferred is a cover blend comprising 50 weight percent of a first high acid ionomer and 50 weight percent of a second ionomer which is different than said first high acid ionomer and is either a high acid ionomer neutralized with a different metal ion than said first high acid ionomer or an ionomer having an acid content of less than 16 weight percent.

The high acid ionomers according to the present invention may be any ionomer from the group selected from ethylene acrylic acid and ethylene methacrylic acid based copolymers which contain about 19% by weight acid groups and which are partially neutralized by a monovalent, divalent or trivalent metal ion.

The monovalent, divalent and trivalent metal ions employed to neutralize the acid groups include magnesium, lithium, potassium, calcium, sodium, manganese, nickel or zinc ions or a combination of such cations. Preferably, the metal ion is lithium, sodium, or zinc. Typically, the metal ions neutralize about 10% to about 90% of the acid groups. Preferably, the metal ions neutralize about 15% to about 80% of the acid groups.

Covers according to the present invention comprise ionomers containing about 19 weight percent acid, and exhibit improved distance, playability, and durability as compared to prior art golf balls. In particular, the invention comprises golf ball covers comprising a 50/50 blend of two Du Pont ionomers, SURLYN® 9120, a zinc-neutralized ethylene-methacrylic acid ionomer, containing about 19 weight percent acid, and SURLYN® 8140, a sodium-neutralized ethylene-methacrylic acid ionomer also containing about 19 weight percent acid. Properties of these ionomers are given in Table 1.

TABLE 1

| IONOMER | SURLYN ® 9120 | SURLYN ® 8140 |
|---|---|---|
| Cation | Zn | Na |
| Melt Index (grams per 10 min.) | 1.0 | 2.6 |
| Specific Gravity | 0.97 | 0.96 |
| Tensile Strength, psi | 3,800 | 5,000 |
| Yield Strength, psi | 2,300 | 2,800 |
| Elongation, % | 280 | 340 |
| Hardness, D | 68 | 70 |
| Flexural Modulus, kpsi | 64 | 79 |
| Melting Point, °C. | 85 | 88 |
| Freeze point, °C. | 50 | 49 |

Other ionomers which may be used in the present invention include those mentioned in U.S. Pat. Nos. 3,359,231; 4,234,184; 5,068,151; 4,986,545; 5,120,791; 5,159,035; 4,123,061; 3,490,146; 4,337,947; 4,398,000; and, 3,310,102 said patents being herein incorporated by reference in their relevant parts. Further, ionomers under the tradename IOTEK available from Exxon are also within the intended scope of the present invention.

Preferred blends of ionomers include those specified in Table 2:

TABLE 2

| | Blend #1 | Blend #2 | Blend #3 | Blend #4 | Blend #5 | Blend #6 (comparative) |
|---|---|---|---|---|---|---|
| Surlyn 7930 | 50 | | | | | 50 |
| Surlyn 7940 | | 50 | | | | |
| Surlyn 8140 | 50 | 50 | 50 | 10 | 50 | |
| Surlyn 8660 | | | | | | 10 |
| Surlyn 8920 | | | | | | 40 |
| Surlyn 9120 | | | | | 50 | |
| High Acid Lithium Surlyn (SEP-671) | | | 50 | 90 | | |
| White Concentrate | 5 | 5 | 5 | 5 | 5 | 5 |
| Hardness, Shore D | 69 | 69 | 69 | 70 | 67 | 69 |
| Flex Modulus, ksi | 102 | 100 | 118 | 108 | 110 | 62 |

Additional compatible additive materials may also be added to the golf ball cover blends of the present invention, including dyes and pigments, such as zinc oxide, zinc sulfate, titanium dioxide, and fluorescent pigments. Trace amounts of blue pigment may be added to the composition to impart a blue white appearance. Other pigments, in the amount necessary to produced the desired color, can also be added to the composition.

Furthermore, compatible materials that do not affect the novel characteristics of the composition of this invention can also be added. These materials include antioxidants, antistatic agents, stabilizers, processing aids, softening agents, optical brightness, plasticizers, and reinforcing materials, such as glass fibers and inorganic fillers, as long as the desired properties of the golf ball covers of the invention are not impaired.

In general additives are admixed together to provide a masterbatch of desired concentration. An amount of the masterbatch sufficient to provide the desired amounts of additive is then admixed with the ionomers to form a golf ball cover blend. In the most preferred mode of the present invention, the golf ball cover composition comprises the additive and equal amounts by weight of the SURLYN® 9120 and SURLYN®8140.

The cover compositions of the present invention may be produced according to conventional melt blending procedures. In the most preferred mode lithium and zinc and sodium neutralized high acid ethylene-methacrylic acid ionomer resins are blended along with any additives in a Banbury type mixer, two-roll mill, or extruded prior to molding. The blended composition is then formed into slabs or pellets for storage prior to molding. Alternatively, a simple dry blend of pelletized or granulated resins and color masterbatch may be prepared and fed directly into the injection molding machine, where homogenization occurs in the mixing section of the barrel prior to injection into the mold. Further additives, such as inorganic fillers, etc., may be added and uniformly mixed before initiation of the molding process.

The present invention is also directed towards a multilayer golf ball which comprises a core, at least one cover layer having as a component a high acid ionomer and optionally at least one mantle layer disposed therebetween. According to this embodiment of the present invention the mantle layer may comprise a dynamically vulcanized thermoplastic elastomer, functionalized styrene-butadiene elastomer, thermoplastic polyurethane or metallocene catalyzed polymer or blends thereof.

Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203–40 is an example of a preferred Santoprene® and is commercially available from Advanced Elastomer Systems. Examples of suitable functionalized styrene-butadiene elastomers include Kraton FG-1901x and FG-1921x, which is available from the Shell Corporation. Examples of suitable thermoplastic polyurethanes include Estane® 58133, Estane® 58134 and Estane® 58144, which are commercially available from the B. F. Goodrich Company. Suitable metallocene catalyzed polymers whose melting points are higher than the cover materials can also be employed in the mantle layer of the present invention. Further, the materials for the mantle layer described above may be in the form of a foamed polymeric material. For example, suitable metallocene catalyzed polymers include foams of thermoplastic elastomers based on metallocene single-site catalyst-based foams.

If a mantle is used in golf balls according to the present invention then the mantle layer may comprise up to 100% by weight of a dynamically vulcanized thermoplastic elastomer, a functionalized styrene-butadiene elastomer, a thermoplastic polyurethane, a metallocene catalyzed polymer or blends thereof. In a preferred embodiment of the present invention, the mantle layer comprises Santoprene®, thermoplastic polyurethane or blends thereof.

However, in another preferred embodiment of the present invention, the mantle layer is a blend of a first and a second thermoplastic, wherein the first thermoplastic is a dynamically vulcanized thermoplastic elastomer, a functionalized styrene-butadiene elastomer, a thermoplastic polyurethane or a metallocene catalyzed polymer and the second thermoplastic is a material such as a thermoplastic polyurethane, a thermoplastic polyetherester block copolymer or polyetheramide block copolymer, a thermoplastic ionomer resin, a thermoplastic polyester, another dynamically vulcanized elastomer, another a functionalized styrene-butadiene elastomer, another a metallocene catalyzed polymer or blends thereof.

Suitable thermoplastic polyetherester block copolymer include Hytrel® 3078, Hytrel® G3548W and Hytrel® G4078W which are commercially available from DuPont. Suitable thermoplastic polyetheramide block copolymer include Pebax® 2533, Pebax® 3533 and Pebax® 4033 which are available from Elf-Atochem. Suitable thermoplastic ionomer resins include any number of olefinic based ionomers including SURLYN® and Iotek®, which are commercially available from DuPont and Exxon, respectively. The flexural moduli for these ionomers is about 100 kpsi to about 200 kpsi. Suitable thermoplastic polyesters include polybutylene terephthalate. Likewise, the dynamically vulcanized thermoplastic elastomers, functionalized styrene-butadiene elastomers, thermoplastic polyurethane or metallocene catalyzed polymers identified above are also useful as the second thermoplastic in such blends. Further, the materials of the second thermoplastic described above may be in the form of a foamed polymeric material.

Such thermoplastic blends comprise about 1% to about 99% by weight of a first thermoplastic and about 99% to about 1% by weight of a second thermoplastic. Preferably the thermoplastic blend comprises about 5% to about 95% by weight of a first thermoplastic and about 95% to about 5% by weight of a second thermoplastic. In a preferred embodiment of the present invention, the first thermoplastic material of the blend is a dynamically vulcanized thermoplastic elastomer, such as Santoprene®.

The core of the present invention may comprise a variety of materials, including those conventionally employed as golf ball cores. The conventional materials for such cores include core compositions having a base rubber, a crosslinking agent, a filler and a co-crosslinking agent. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. The initiator included in the core composition can be any known polymerization initiator which decomposes during the cure cycle. The crosslinking agent includes a metal salt of an unsaturated fatty acid such as a zinc salt or a magnesium salt of an unsaturated fatty acid having 3 to 8 carbon atoms such as acrylic or methacrylic acid. The filler typically includes materials such as zinc oxide, barium sulfate, silica, calcium carbonate, zinc carbonate and the like.

In one embodiment of the present invention, the core comprises a center which is liquid-filled or solid around which an elastic thread is wound. The solid center is typically a homogenous mass of a resilient material such as polybutadiene or a natural rubber. The liquid-filled center is typically a thin walled sphere into which an aqueous solution containing a solute in concentrations sufficient to control ball mass and moment of inertia, said solution being injected with a hypodermic needle. The sphere is then sealed and frozen to make the center a solid mass. The windings for either type of center are provided by an elastic thread which is stretched and wound about the center to a desired thickness.

Conventionally, the centers of wound cores have a diameter of about 1.0 to about 1.125 inches. The outer diameter of a conventional wound core is typically from about 91 to about 96 percent, or more preferably about 92%, of the overall diameter of the finished ball. However, the outer diameter of wound cores employed in this embodiment of the present invention have an overall diameter of less than 95% of the overall diameter of the finished ball. Preferably, the wound cores have a diameter of from about 70 to 95 percent, and most preferably 75 to 90 percent of the overall diameter of the finished ball. Most preferably, the wound cores of the present invention have an overall diameter of about 85% of the diameter of the finished ball.

In its broadest interpretation the cover layer of the present invention comprises at least one layer of a thermoplastic or thermosetting material. Any number of a wide variety of cover materials maybe be used in the present invention. Among the preferred conventional cover materials are ionomer resins obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component of the subject invention includes E/X/Y copolymers where E is ethylene, X is a softening comonomer such as acrylate or methacrylate present in 0–50 (preferably 0–25, most preferably 0–2), weight percent of the polymer, and Y is acrylic or methacrylic acid present in 5–35 (preferably 10–35, most preferably 15–35) weight percent of the polymer, wherein the acid moiety is neutralized 1–90% (preferably at least 40%, most preferably at least about 60%) to form an ionomer which is partially neutralized by a cation.

Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers. The manner in which the ionomers are made is well known in the art as described in e.g. U.S. Pat. No. 3,262,272. Such ionomer resins are commercially available from DuPont Co. under the tradename SURLYN® and from Exxon under the trademark IOTEK™. Likewise, other conventional materials such as balata, polyurethanes, elastomers and polyethylene may also be used in the cover layers of the present invention. Additionally, foamed polymeric materials are suitable for use in the cover layers of the present invention. In particular, metallocene-catalyzed foam resins are useful in the cover layers of the present invention.

In a preferred embodiment of the present invention, the cover layer comprises an inner layer and an outer layer. The inner layer of the cover is either a thermoplastic material such as a thermoplastic elastomer or a thermoplastic rubber, or a thermoset rubber or thermoset elastomer material. Some examples of materials suitable for use as the inner cover layer include polyether or polyester thermoplastic urethanes as well as thermoset polyurethanes. A preferable thermoplastic material is a thermoplastic urethane with a melting point of about 178° to about 205° F. A preferable thermoset material is a rubber based, castable urethane. The outer layer of the cover is either a thermoplastic plastic material such as an elastomer or a thermoplastic rubber, or a thermosetting material. Suitable materials for the outer layer include Urethanes, ionomers with a low modulus and other "dead" but durable materials such as EPDM and butyl rubber. Additionally, the present invention also contemplates the use of a polymeric foam material, such as the metallocene-based foamed resin described above, as the material for either the outer cover layer or the inner cover layer, but preferably not both layers.

In one embodiment of the present invention, it is preferable that the thermoplastic or thermosetting materials of the outer layer have a melting point or heat of reaction (cure) temperature less than the melting point or heat of reaction (cure) temperature of the materials of the inner layer.

The inner and outer cover layers of this embodiment of the invention can be molded about the core and mantle layers through a variety of conventional molding methods. For example, the cover layers can be compression molded, retractable pin injection molded, fixed pin injection molded, cast around the core and mantle or a combination thereof. However, it is important that the materials of the outer layer are characterized in that they have thermal properties such that no flow of the inner layer material occurs during the molding of the outer cover layer about the inner layer, regardless of the process employed to mold the layers. Various methods of making such golf ball compositions are disclosed in U.S. Ser. No. 08/484,249, entitled "Method Of Making Multilayer Golfballs", filed Jun. 7, 1995, which is herein incorporated by reference in its entirety.

The inner cover layer of this embodiment of the present invention can have a thickness of about 0.005 inches to about 0.040 inches. The outer cover layer can have a thickness of about 0.010 inches to about 0.100 inches. Preferably, the inner cover layer has a thickness of about 0.010 inches to about 0.030 inches and the outer cover layer has a thickness of about 0.030 inches to about 0.090 inches.

In particular, the thickness of the mantle layer of the present invention may be from about 0.025 inches to about 0.125 inches. Preferably, the thickness of the mantle layer is about 0.04 inches to about 0.10 inches. Most preferably, the thickness of the mantle layer is about 0.050 inches to about 0.080 inches. Similarly, the diameter of the core of the present invention is about 1.25 inches to about 1.51 inches. Preferably the diameter of the core is about 1.30 inches to about 1.48 inches. The overall diameter of the core and mantle layer is about 84% to about 97% of the overall diameter of the finished ball.

The present multi-layer golf ball can have an overall diameter of any size suitable for use as a game ball. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. However, oversized game balls well in excess of 1.800 inches are also contemplated by the present invention.

Several physical properties such as hardness, resilience and modulus of the various layers of the golf balls of the present invention are believed to impact the playing characteristics of such golf balls. For example, the flexural and/or tensile moduli of the mantle layer are believed to have an effect on the "feel" of the golf balls of the present invention. Accordingly, it is preferable that the golf balls of the present invention have a mantle layer with a flexural modulus of about 500 psi to about 50,000 psi in order to impart a softer "feel" to the golf balls of the present invention. Likewise, it is preferred that the mantle layer have a tensile modulus of about 500 psi to about 50,000 psi in order to impart a softer "feel" to the golf balls of the present invention.

Further, the core of the present invention has a bayshore resilience of greater than about 20, or more preferably from about 30 to about 95. Preferably the core has a Bayshore resilience of about 40 to about 70. The mantle layer of the present invention has a Bayshore resilience of greater than about 35 or more preferably from about 35 to about 85. Preferably the mantle layer has a Bayshore resilience of about 40 to about 75.

The golf balls of the present invention have a mantle layer with a Shore D hardness of less than about 60. Preferably, the Shore D hardness of the mantle layer is about 20 to about 60. The core has a Shore D surface hardness of about 30 to about 65. Preferably, the core has a Shore D surface hardness of about 35 to about 60.

The golf balls of the present invention can be made by any conventional process employed in the golf ball art. For example, the solid cores can be either injection or compression molded. Similarly, the undersized wound cores of the present invention are produced through conventional means.

The mantle layer may be subsequently injection or compression molded about the core. It is important that the mantle material be able to sustain the temperatures applied during the application of the cover layer. The cover layer or layers are then injection or compression molded or cast about the mantle layer.

Golf balls according to the present invention can be produced by any molding process known in the art. Golf balls can be produced by injection molding or compression molding the novel cover composition around wound or solid molded cores that meets the standards of the USGA. The term "solid core", as used herein, refers to one-piece cores and those cores having a separate, solid layer(s) between the cover and the core.

Golf ball covers according to the invention can be formed by compression molding by injection of the composition at about 380° F. to about 450° F. into smooth surfaced hemispherical shells, which are then positioned around the core in a dimpled golf ball mold. The covered ball is subjected to compression molding at about 200°–300° F. for about 2–10 minutes, followed by cooling at 50°–70° F. for about 2–10 minutes to fuse the shells together to form a ball.

When a cover according to the present invention is produced by injection molding, the cover composition is injected directly around the core, which is placed in the center of a golf ball mold at a temperature of about 50° F. to 100° F. After molding, the golf balls may undergo various further finishing steps, such as buffing, painting, and marking.

EXAMPLES

The following non-limiting examples are merely illustrative of the preferred embodiments of the present invention, and are not to be construed as limiting the invention, the scope of which is defined by the appended claims.

Example I

A cover composition comprising 50 parts by weight SURLYN® 9120, 50 parts by weight SURLYN® 8140, and 5 parts by weight of a white pigment was prepared in accordance with the present invention. The properties of a golf ball having a standard solid core are given below in Table 3, and compared with a ball with a prior art cover.

TABLE 3

|  | 50/50 Blend of SURLYN 9120 & 8140 (two-piece ball) | 50/50 Blend of SURLYN 8140 & 7940 (two-piece ball) | Comparative Blend (No. 6 of Table 2) |
|---|---|---|---|
| Ball Properties |  |  |  |
| 1. Physical Properties |  |  |  |
| Hardness (shore-D) | 66 | 71 | 70 |
| PGA | 109 | 96 | 96 |
| 2. Velocity/COR |  |  |  |
| Initial velocity, ft/sec | 254.43 | 253.4 | 252.5 |
| COR (at 125 ft/sec) | 0.821 |  |  |
| 3. Durability |  | 500× | 500× |
| Hit test at Room Temperature (50% failure) | 500× | 400× | 400× |
| Hit test at Room Temperature (1st failure) | 400× | No Failure | No Failure |
| Cold Crack Test at 5° F. | No Failure |  |  |

TABLE 3-continued

|  | 50/50 Blend of SURLYN 9120 & 8140 (two-piece ball) | 50/50 Blend of SURLYN 8140 & 7940 (two-piece ball) | Comparative Blend (No. 6 of Table 2) |
| --- | --- | --- | --- |
| Shear Resistant Rating | excellent | excellent | good |
| Cut Resistant Rating (lower number more durable) | good | good | good |
| 4. Spin |  |  |  |
| Spin Rate from Driver, rpm | 3170 | 3158 | 3180 |
| Spin Rate from 8-iron, rpm | 7550 | 7450 | 7561 |

Table 4 describes some of the physical properties of golf ball cover blends described in Table 3 above:

TABLE 4

| Blend # | Specific Gravity | Hardness Shore D | Bayshore Resilience | Tensile Strength psi | Tensile Modulus kpsi | Flex Modulus ksi |
| --- | --- | --- | --- | --- | --- | --- |
| 1 | .921 | 69 | 60 | 4100 | 81.5 | 102.4 |
| 2 | .919 | 69 | 58 | 3720 | 75.4 | 100.4 |
| 3 | .918 | 69 | 58 | 4120 | 84.9 | 117.7 |
| 4 | .939 | 70 | 60 | 4900 | 75.6 | 107.6 |
| 5 | .956 | 67 | 59 | 4300 | 86.6 | 109.5 |
| 6 | .945 | 69 | 55 | 2600 | 27.5 | 62 |

As demonstrated in Table 4, cover blends according to the present invention exhibit high Shore D hardness and excellent tensile strength and Bayshore Resilience.

Finished golf balls were prepared using the cover composition of the present invention and a comparative composition with a solid, preformed polybutadiene core. Both the covers of the invention and the comparative examples were molded under essentially the same conditions. The mechanical and physical properties, as well as the playability properties, were then determined.

The data represents the average for the data of 12 balls produced according to the invention and 12 balls according to the prior art.

Shore hardness was measured in accordance with ASTM Test D-2240.

Cold cracking was measured by firing balls from an air cannon after the balls had been conditioned for 24 hours at 5° F. The balls were then allowed to warm to room temperature, and then inspected for cover cracking.

The spin rate was measured by striking golf balls with a driver and an 8-iron, and measuring the spin rate with strobe photography.

All aforementioned patents and patent applications are herein incorporated by reference in their entirety.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

We claim:

1. A golf ball comprising
   (a) a core; and
   (b) at least one cover layer comprising a blend of:
      i) from about 45 to 55 weight percent of a high acid ionomer formed from an acid copolymer having an acid content of 19 weight percent; and
      ii) from about 55 to 45 weight percent of an ionomer formed from an acid copolymer having an acid content of 15 weight percent.

2. The golf ball of claim 1 wherein the first high acid ionomer is neutralized with metal ions selected from the group consisting of zinc, lithium and sodium ions.

3. The golf ball of claim 1, wherein the golf ball further comprises a mantle layer between the core and the cover layer.

4. The golf ball of claim 3, wherein the mantle layer comprises a foamed polymer.

5. The golf ball of claim 3, wherein said mantle layer comprises a foamed polymer.

6. The golf ball of claim 3, wherein the mantle layer comprises a blend of a first thermoplastic material comprising a dynamically vulcanized thermoplastic elastomer, a functionalized styrene-butadiene elastomer, a polyetherester block copolymer, a polyesterester block copolymer, a polyetheramide block copolymer, a metallocene-catalyzed polymer or a thermoplastic polyurethane or blends thereof and a second thermoplastic material.

7. The golf ball of claim 6, wherein the blend comprises about 1% to about 99% of a first thermoplastic and about 99% to about 1% of a second thermoplastic.

8. The golf ball of claim 7, wherein the blend comprises about 5% to about 95% of a first thermoplastic ionomer and about 95% to about 5% of a second thermoplastic ionomer.

9. The golf ball of claim 3, wherein the mantle layer has a thickness of from about 0.025 inches to about 0.125 inches.

10. The golf ball of claim 3, wherein the core has a diameter of from about 1.10 inches to about 1.51 inches.

11. The golf ball of claim 3, wherein the mantle has a flex modulus of about 500 psi to about 70,000 psi.

12. The golf ball of claim 3, wherein the mantle has a tensile modulus of about 500 psi to about 50,000 psi.

13. The golf ball of claim 3, wherein the mantle layer has a Shore D hardness of less than about 70.

14. The golf ball of claim 3, wherein the cover blend has a Shore D hardness of at least about 69.

15. The golf ball of claim 1 wherein the core comprises a wound core, the wound core comprising a center about which an elastic thread is wound such that the wound core has an overall diameter of from about 75% to about 90% of the overall diameter of the finished ball.

16. The golf ball of claim 1 wherein the golf ball has an overall diameter of from about 1.68 inches to about 1.80 inches.

17. The golf ball of claim 1, wherein the cover blend has a Shore D hardness of at least about 69.

18. A golf ball comprising a cover and a core, wherein the cover comprises at least a first and a second cover layer wherein:
   (a) the first layer is an ionomer blend comprising:

i) from about 45 to 55 weight percent of a high acid ionomer formed from an acid copolymer having an acid content of 19 weight percent; and ii) from about 55 to 45 weight percent of an ionomer formed from an acid copolymer having an acid content of 15 weight percent; and (b) the second layer comprising at least one polymer selected from the group consisting of a thermoplastic polyurethane, a thermoplastic polyetherester block copolymer or polyetheramide block copolymer, thermoplastic polyesters, polyesterester block copolymer, thermoplastic ionomer resins, a dynamically vulcanized thermoplastic elastomer, a functionalized styrene-butadiene elastomer, and a metallocene-catalyzed polymer.

19. The golf ball of claim 18, wherein the second cover layer comprises a material selected from the group consisting of polyetherester block copolymers and polyesterester block copolymers.

20. The golf ball of claim 8, wherein the cover blend has a Shore D hardness of at least about 69.

21. A golf ball comprising:
(a) a core;
(b) at least one mantle layer disposed between the core and a cover layer, wherein the mantle layer comprises a material selected from the group consisting of dynamically vulcanized thermoplastic elastomer, functionalized styrene-butadiene elastomer, thermoplastic polyurethane or metallocene-catalyzed polymer, thermoplastic polyetherester block copolymers or polyetheramide block copolymers, thermoplastic polyesters, polyesterester block copolymers and thermoplastic ionomer resins; and
(c) a cover layer comprising a blend of 1) from about 45 to 55 weight percent of a high acid ionomer formed from an acid copolymer having an acid content of 19 weight percent; and 2) from about 55 to 45 weight percent of an ionomer formed from an acid copolymer having an acid content of 15 weight percent.

22. The golf ball of claim 21, wherein the cover blend has a Shore D hardness of at least about 69.

23. The golf ball of claim 21, wherein the mantle layer has a thickness of about 0.025 inches to about 0.125 inches and the cover layer has a thickness of about 0.015 inches to about 0.190 inches.

24. The golf ball of claim 21, wherein the mantle layer comprises a foamed polymeric material.

25. The golf ball cover of claim 21, which further comprises one or more additional ingredients, selected from the group consisting of fillers, pigments, dyes, U.V. absorbers, and optical brighteners.

26. The golf ball of claim 21, wherein the overall diameter of the finished ball is about 1.68 inches to about 1.80 inches.

27. The golf ball of claim 21, wherein the cover layer comprises an inner cover layer and an outer cover layer, wherein the inner cover layer is disposed between the outer cover layer and the mantle and comprises an ionomer blend comprising:
i) from about 45 to 55 weight percent of a high acid ionomer formed from an acid copolymer having an acid content of 19 weight percent; and
ii) from about 55 to 45 weight percent of an ionomer formed from an acid copolymer having an acid content of 15 weight percent; and
an outer layer comprising a thermoplastic or thermoset material.

28. The golf ball of claim 27, wherein the outer layer comprises thermoplastic elastomers, thermoplastic rubber or a thermoset elastomer.

29. The golf ball of claim 27, wherein the outer layer comprises a urethane.

30. The golf ball of claim 27, wherein the inner cover layer blend has a Shore D hardness of at least about 69.

31. The golf ball of claim 29, wherein the inner cover layer comprises a foamed ionomeric material.

32. A golf ball comprising:
(a) a core; and
(b) at least one cover layer comprising a blend of:
(i) from about 45 to 55 weight percent of a high acid ionomer formed from an acid copolymer having an acid content of 19 weight percent, wherein said ionomer is at least partially neutralized with sodium ions; and
(ii) from about 55 to 45 weight percent of an ionomer formed from an acid copolymer having an acid content of 15 percent, wherein said ionomer is at least partially neutralized with lithium ions.

33. The golf ball of claim 32, wherein the cover blend comprises substantially the same amount of said high acid ionomer and said ionomer formed from an acid copolymer having an acid content of 15 weight percent.

34. The golf ball of claim 32, which further comprises a mantle layer disposed between the cover and the core.

35. The golf ball of claim 34, wherein the mantle layer comprises a thermoplastic material selected from the group consisting of a dynamically vulcanized thermoplastic elastomer, a functionalized styrene-butadiene elastomer, a polyetherester block copolymer, a polyesterester block copolymer, a polyetheramide block copolymer, a metallocene-catalyzed polymer or a thermoplastic polyurethane or blends thereof.

36. The golf ball of claim 35, wherein the mantle layer comprises a thermoplastic material selected from the group consisting of a polyetherester block copolymer, a polyesterester block copolymer or a polyetheramide block copolymer.

* * * * *